US008364390B2

(12) United States Patent
Harada et al.

(10) Patent No.: US 8,364,390 B2
(45) Date of Patent: Jan. 29, 2013

(54) ENVIRONMENT PREDICTION DEVICE

(75) Inventors: Masahiro Harada, Atsugi (JP); Katsuhiro Sakai, Hadano (JP); Kazuaki Aso, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 217 days.

(21) Appl. No.: 12/857,961

(22) Filed: Aug. 17, 2010

(65) Prior Publication Data

US 2011/0054793 A1 Mar. 3, 2011

(30) Foreign Application Priority Data

Aug. 25, 2009 (JP) ................................ 2009-194427

(51) Int. Cl.
*G06F 17/00* (2006.01)
*G06F 7/00* (2006.01)
*G01C 22/00* (2006.01)
*B60Q 1/00* (2006.01)

(52) U.S. Cl. ............. 701/301; 701/96; 701/93; 701/23; 340/435; 340/436

(58) Field of Classification Search ........................ None
See application file for complete search history.

(56) References Cited

U.S. PATENT DOCUMENTS

| | | | | |
|---|---|---|---|---|
| 5,926,126 | A * | 7/1999 | Engelman | 342/70 |
| 6,026,347 | A * | 2/2000 | Schuster | 701/301 |
| 6,873,911 | B2 * | 3/2005 | Nishira et al. | 701/301 |
| 2003/0187578 | A1 * | 10/2003 | Nishira et al. | 701/301 |
| 2009/0024357 | A1 * | 1/2009 | Aso et al. | 702/181 |
| 2010/0010699 | A1 * | 1/2010 | Taguchi et al. | 701/23 |
| 2011/0137562 | A1 * | 6/2011 | Taguchi | 701/301 |

FOREIGN PATENT DOCUMENTS

| | | | |
|---|---|---|---|
| JP | 2006154967 | A | 6/2006 |
| JP | 2007230454 | A | 9/2007 |
| JP | 2008070998 | A | 3/2008 |
| JP | 2008-117082 | A | 5/2008 |
| JP | 2009-037561 | A | 2/2009 |

* cited by examiner

*Primary Examiner* — Mussa A Shaawat

(74) *Attorney, Agent, or Firm* — Gifford, Krass, Sprinkle, Anderson & Citkowski, P.C.

(57) ABSTRACT

An environment prediction device can acquire sufficient information regarding the behavior of an object in the vicinity of a host-vehicle for appropriate traveling assistance. An environment prediction device 1 includes a road information acquisition section 4 which acquires road information regarding a road A, a host-vehicle position prediction section 61 which predicts the position of a host-vehicle 81 after a predetermined time has elapsed, and a prediction period setting section 62 which sets a prediction period T on the basis of the road information and the position of the host-vehicle 81 after the predetermined time has elapsed. With this configuration, it is possible to acquire sufficient information regarding the behavior of an object in the vicinity of the host-vehicle.

7 Claims, 19 Drawing Sheets

ENVIRONMENT PREDICTION DEVICE

CROSS-REFERENCE TO RELATED APPLICATIONS

This application claims priority of Japanese Patent Application P2009-194427 filed Aug. 25, 2009.

BACKGROUND OF THE INVENTION

1. Field of the Invention

The present invention relates to an environment prediction device that predicts a future route of another vehicle or the like.

2. Related Background Art

In recent years, various systems have been disclosed which predict collision against another vehicle and prevent a collision or reduces the effect of a collision.

For example, Patent Document 1 (JP2007-230454A) describes a technique which generates a change with time of the possible position of each of a plurality of objects as a spatiotemporal route on the basis of the positions and the states of the objects, calculates the interference degree which quantitatively shows the degree of interference between the possible route of a specific object and the possible route of another object, from the stochastic prediction result based on the routes, and selects the route to be taken by the specific object in accordance with the calculated interference degree.

SUMMARY OF THE INVENTION

In the route selection technique of the related art, it is possible to ensure safety in an actually possible situation. However, in generating a route, if the route generation time is extended, the computational load increases. Meanwhile, if the route generation time is shortened, it is impossible to determine interference or the like occurring when the host-vehicle should avoid another vehicle, and it is impossible to acquire sufficient information for traveling assistance.

An object of the invention is to provide an environment prediction device which can acquire sufficient information regarding the behavior of an object in the vicinity of a host-vehicle for appropriate traveling assistance.

An aspect of the invention provides an environment prediction device which predicts the behavior of an object in the vicinity of a host-vehicle until a predetermined prediction period elapses. The environment prediction device includes a road information acquisition unit which acquires information regarding a road, a host-vehicle position prediction unit which predicts the position of the host-vehicle after a predetermined time, and a prediction period setting unit which sets the prediction period on the basis of the information regarding the road and the position of the host-vehicle after the predetermined time.

The term "information regarding the road" used herein includes position information of road structures, such as lanes and intersections, and traffic rules, such as regulations in terms of road structures and traveling priority. Thus, for example, it is possible to obtain information that "part of the predicted route of the host-vehicle is deviated from the traffic rules".

According to this environment prediction device, the prediction period is set on the basis of the information regarding the road and the position of the host-vehicle after the predetermined time. Thus, the prediction period setting unit can set the prediction period on the basis of the traffic rule which can be acquired from the information regarding the road by the host-vehicle, and sets the prediction period such that the prediction period is continued while the host-vehicle is interfering with the route of another vehicle. As a result, it is possible to avoid interference occurring when the host-vehicle should avoid another vehicle, such that it is possible to acquire sufficient information regarding the behavior of an object in the vicinity of the host-vehicle for appropriate traveling assistance.

In the environment prediction device according to the aspect of the invention, when the position of the host-vehicle after the predetermined time is deviated from a traffic rule which can be acquired from the information regarding the road, the prediction period setting section may set the prediction period longer than when the position of the host-vehicle observes the traffic rule. Therefore, when the position of the host-vehicle is deviated from the traffic rule, the prediction period is extended so as to prevent prediction from being terminated.

The environment prediction device according to the aspect of the invention may further include an obstacle information acquisition unit which acquires obstacle information in the traveling direction of the host-vehicle. The prediction period setting unit may set the prediction period also in consideration of the obstacle information. Therefore, it is possible to generate the route of the host-vehicle which avoids an obstacle, and it is possible to prevent prediction from being terminated during a period in which the host-vehicle avoids an obstacle. In addition, it is possible to perform setting the prediction period taking into consideration the route of another vehicle.

In the environment prediction device according to the aspect of the invention, the prediction period setting unit may set, as the prediction period, a period until the position of the host-vehicle satisfies a predetermined condition. Therefore, it is possible to set, as the prediction period, a period until the host-vehicle observes a traffic rule. As a result, even in a route along which the host-vehicle is traveling while being deviated from a traffic rule, it is possible to set such that prediction is continued until the traffic rule can be observed.

In the environment prediction device according to the aspect of the invention, the prediction period setting unit may set, as the prediction period, a period until the host-vehicle reaches a position where the host-vehicle does not interfere with the route of another vehicle. Therefore, it is possible to reliably avoid interference occurring when the host-vehicle should avoid another vehicle.

The environment prediction device according to the aspect of the invention may further include a behavior plan acquisition unit which acquires a behavior plan of the host-vehicle. The host-vehicle position prediction unit may predict the position of the host-vehicle on the basis of the behavior plan. According to this configuration, it is possible to selectively and accurately predict the position of the host-vehicle after the predetermined time, such that it is possible to provide information for more appropriate traveling assistance without increasing the computational load.

In the environment prediction device according to the aspect of the invention, the prediction period setting unit may set the prediction period longer than the predetermined time. In the environment prediction device according to the aspect of the invention, the host-vehicle position prediction unit may limit prediction to a position where the host-vehicle is not deviated from the traffic rule.

According to the aspect of the invention, it is possible to acquire sufficient information regarding the behavior of an object in the vicinity of the host-vehicle for appropriate traveling assistance.

DETAILED DESCRIPTION OF THE PREFERRED EMBODIMENTS

First Embodiment

Figure 1:
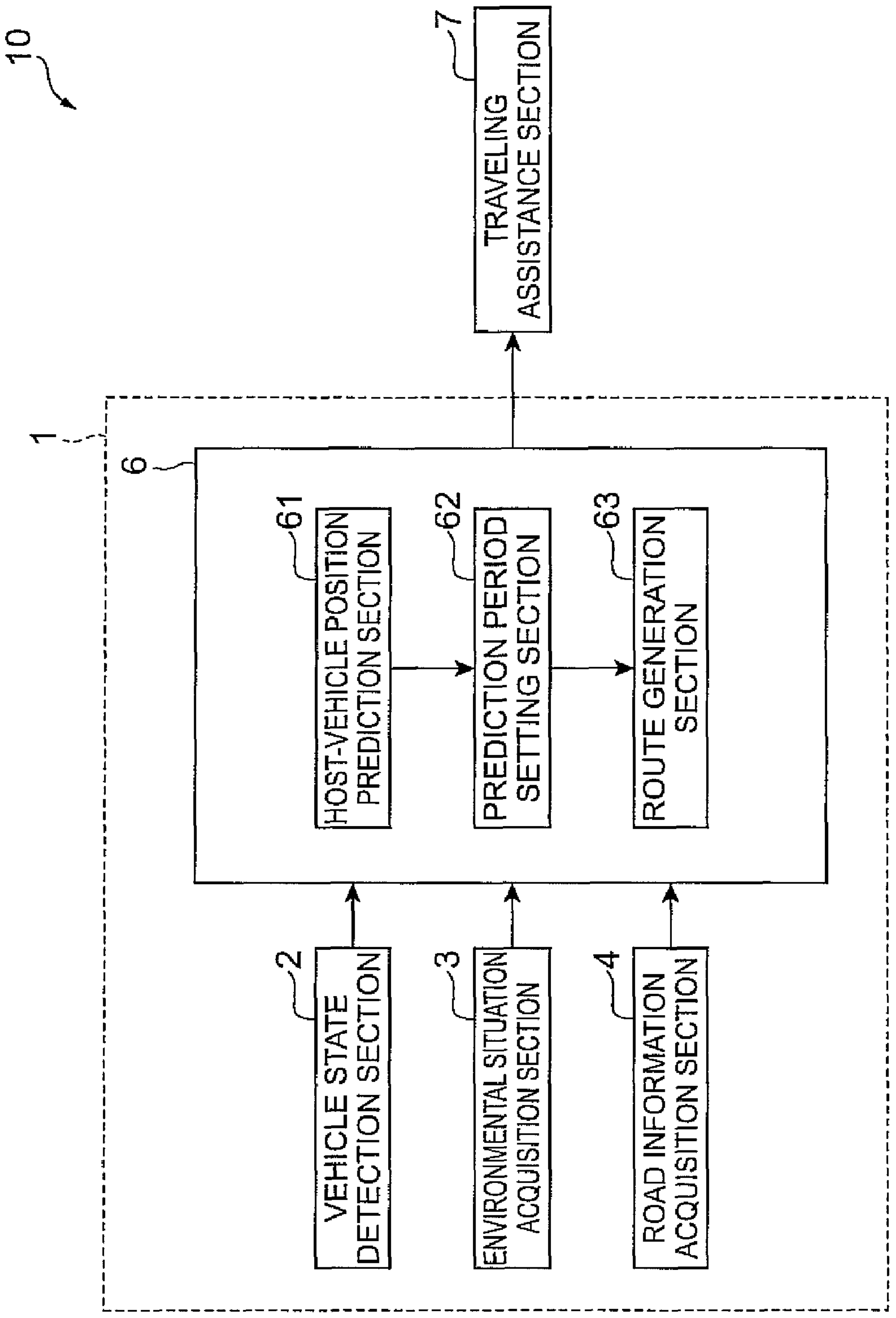
FIG. 1 is a block diagram showing the functional configuration of a traveling assistance device including an environment prediction device according to a first embodiment of the invention.

Hereinafter, a traveling assistance device 10 including an environment prediction device 1 according to an embodiment of the invention will be described with reference to FIGS. 1 to 6. In the description of the drawings, the same parts are represented by the same reference numerals, and overlapping description will be omitted. FIG. 1 is a block diagram showing the functional configuration of the traveling assistance device 10 including the environment prediction device 1 according to the embodiment of the invention.

As shown in FIG. 1, the traveling assistance device 10 includes the environment prediction device 1 and a traveling assistance section 7. The environment prediction device 1 includes a vehicle state detection section (host-vehicle position acquisition unit) 2, an environmental situation acquisition section (obstacle information acquisition unit) 3, a road information acquisition section (road information acquisition unit) 4, and a vehicle control ECU (Electronic Control Unit) 6.

The vehicle state detection section 2 functions as a vehicle state detection unit which detects position information of a vehicle, vehicle speed information, and the like. For the vehicle state detection section 2, for example, a GPS (Global Positioning System), a wheel speed sensor, and the like are used. The GPS acquires position information of the vehicle. The wheel speed sensor is attached to, for example, the wheel of the vehicle, and acquires the wheel speed of the vehicle. The vehicle state detection section 2 is connected to the vehicle control ECU 6, and outputs acquired vehicle state information, such as position information and wheel speed information, to the vehicle control ECU 6.

The environmental situation acquisition section 3 functions as an environmental situation acquisition unit which acquires environmental situation information in the vicinity of a host-vehicle 81. For the environmental situation acquisition section 3, for example, a vehicle-to-vehicle communication device, a road-to-vehicle communication device, or a radar sensor using millimeter waves or laser is used. When a vehicle-to-vehicle communication device or a road-to-vehicle communication device is used, position information and vehicle speed information of another vehicle 82 can be acquired. When a millimeter-wave radar sensor or the like is used, position information and relative speed information of another vehicle 82 and an obstacle on the road can be acquired. The environmental situation acquisition section 3 is connected to the vehicle control ECU 6, and outputs acquired environmental situation information in the vicinity of the host-vehicle 81 to the vehicle control ECU 6.

The road information acquisition section 4 acquires road information (information regarding the road) including position information of road structures, such as lanes and intersections, and traffic rules, such as regulations in terms of road structures, traveling priority, and conventional etiquette. The road information acquisition section 4 may acquire road information from a road database stored in a storage section (not shown) mounted in the host-vehicle, or may acquire road information from a database stored in an external server through a communication device. A prediction period setting section 62 which will be described below acquires road information to obtain information such as "the position of the host-vehicle is deviated from the traffic rules", for example.

Figure 2:
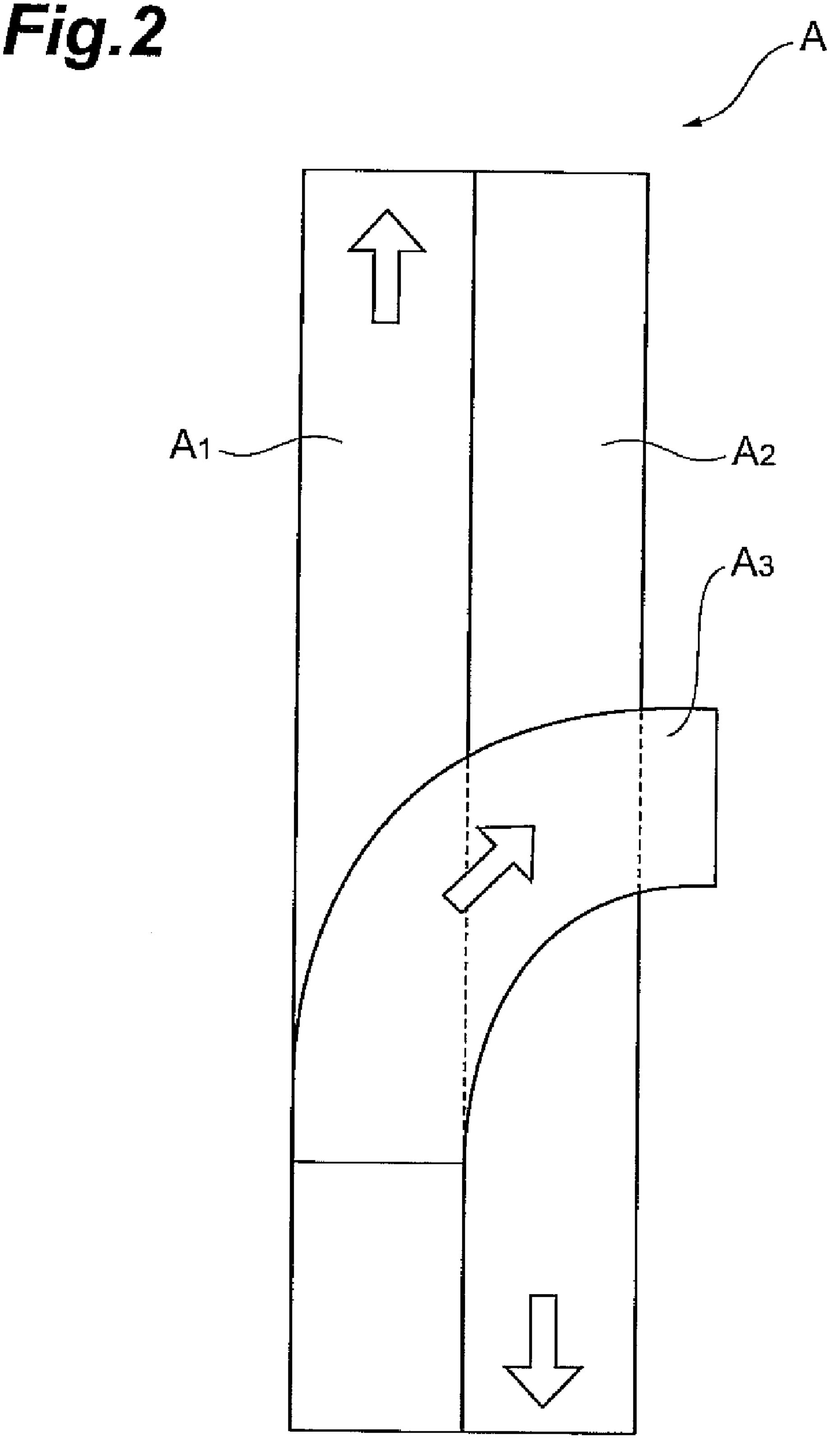
FIG. 2 is a diagram showing an example of road information which is acquired by a road information acquisition section of FIG. 1.

An example of the road database will be described with reference to FIG. 2. FIG. 2 shows an example where the contents of a road database are schematically visualized. The road database outputs traffic rules corresponding to the designated position and time in response to a request from the prediction period setting section 62 which will be described below. The contents of the map database are constituted by region information (when a region is represented by a rectangle, the position (X,Y) of each apex), to which the same traffic rule is applied, and the relevant traffic rule. The traffic rule includes the traveling direction of the relevant region, the speed limit, possibility of stopping, presence/absence of a crosswalk, presence/absence of a stop line, and the like. A road shown in FIG. 2 will be described. A road A is defined by three regions {A1, A2, A3}. Then, for example, the region A1 is defined by the traffic rules such that the speed limit is 50 km/h, the traveling direction is the direction indicated by a white arrow in the drawing, stopping is prohibited, there is no crosswalk, and there is no stop line. The map database also defines the possibility of transition between the regions A1, A2, and A3. For example, as shown in FIG. 2, it is defined such that transition from the region A1 to the region A2 is prohibited, and transition from the region A2 to the region A1 and from the region A1 to the region A3 is permitted.

Returning to FIG. 1, the vehicle control ECU 6 performs overall control of the traveling assistance device 10. For example, the vehicle control ECU 6 primarily includes a computer having a CPU, a ROM, and a RAM (not shown). The vehicle control ECU 6 is connected to the vehicle state detection section 2, the environmental situation acquisition section 3, the road information acquisition section 4, and the traveling assistance section 7. Then, the vehicle control ECU 6 receives various kinds of information from the vehicle state detection section 2, the environmental situation acquisition section 3, and the road information acquisition section 4, and outputs various kinds of information to the traveling assistance section 7. The vehicle control ECU 6 has a host-vehicle position prediction section (host-vehicle position prediction unit) 61, a prediction period setting section (prediction period setting unit) 62, and a route generation section 63.

Figure 4:
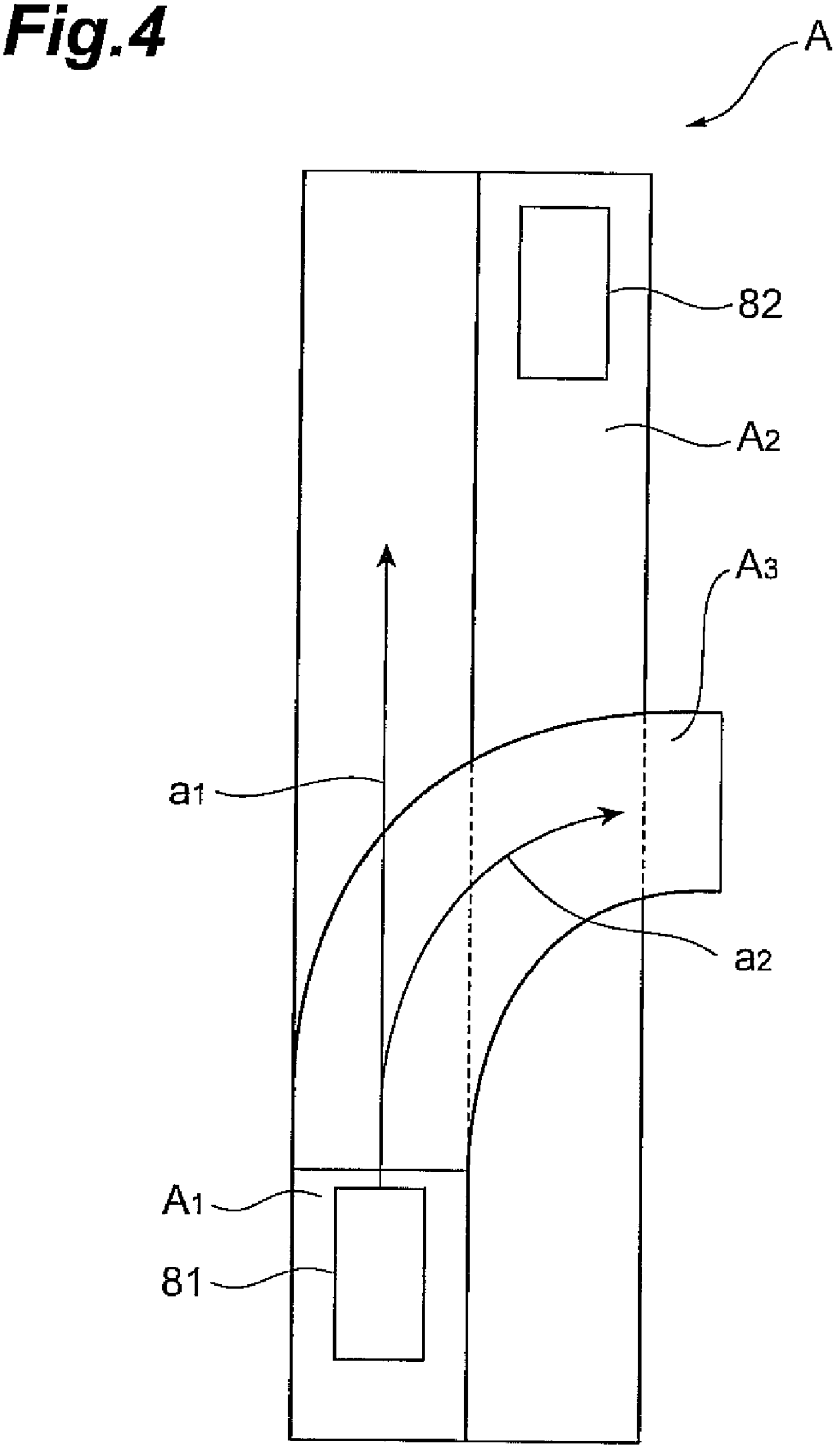
FIG. 4 is a diagram showing a predicted route which is acquired by a host-vehicle position prediction section of FIG. 1.

The host-vehicle position prediction section 61 predicts the position of the host-vehicle 81 after a predetermined time. Preferably, as shown in FIG. 4, the host-vehicle position prediction section 61 generates predicted routes $a_1$ and $a_2$. The host-vehicle position prediction section 61 predicts the state of the host-vehicle 81, such as the future position, speed, direction, and the like, from information regarding the state of the host-vehicle 81, such as the position, speed, direction, and the like, input from the vehicle state detection section 2. The host-vehicle position prediction section 61 outputs the predicted position of the host-vehicle 81, preferably, the predicted routes $a_1$ and $a_2$ shown in FIG. 4 to the prediction period setting section 62. The term "route" used herein refers to a concept including temporal elements, such as time, speed, and the like, and is different from the term "path" which does not include the concept of such temporal elements.

The prediction period setting section 62 sets a prediction period T on the basis of the information regarding the road acquired by the road information acquisition section 4 and the predicted position acquired by the host-vehicle position prediction section 61. Specifically, for example, in the case of the predicted route $a_2$ shown in FIG. 4, the prediction period T until the region A2 (a state of being deviated from a traffic rule) is completely passed is calculated. That is, when the road information acquisition section 4 acquires information that "another vehicle 82 which is traveling along a main line (region A2) has a traveling priority higher than the host-vehicle 81 which turns right", the prediction period setting section 62 extends a period until the predicted position of the host-vehicle 81 completely passes through the region A2, and calculates the prediction period T so as to prevent prediction from being terminated on the region A2. At this time, the prediction period setting section 62 calculates the transit time of the region A2 on the basis of a host-vehicle speed v detected by the vehicle state detection section 2, and calculates the prediction period T. The prediction period setting section 62 sets the thus calculated prediction period T as a period when the route generation section 63 generates a route.

The route generation section 63 generates a spatiotemporal route of each object on the basis of the prediction period T set by the prediction period setting section 62.

The host-vehicle position prediction section 61, the prediction period setting section 62, and the route generation section 63, which are provided in the vehicle control ECU 6, may be constituted by loading a program on the computer, or may be constituted by individual hardware.

As shown in FIG. 1, the traveling assistance section 7 performs traveling assistance of the host-vehicle 81. The traveling assistance section 7 is connected to the vehicle control ECU 6. Then, the traveling assistance section 7 receives control signals from the vehicle control ECU 6 and carries out driving of the host-vehicle 81, for example, traveling drive, a braking operation, and a steering operation. For the traveling assistance section 7, for example, a traveling drive ECU that controls an actuator for adjusting the opening degree of a throttle valve of an engine, a braking ECU that controls a brake actuator for adjusting hydraulic brake pressure, a steering ECU that controls a steering actuator for providing steering torque, and the like are used.

Figure 3:
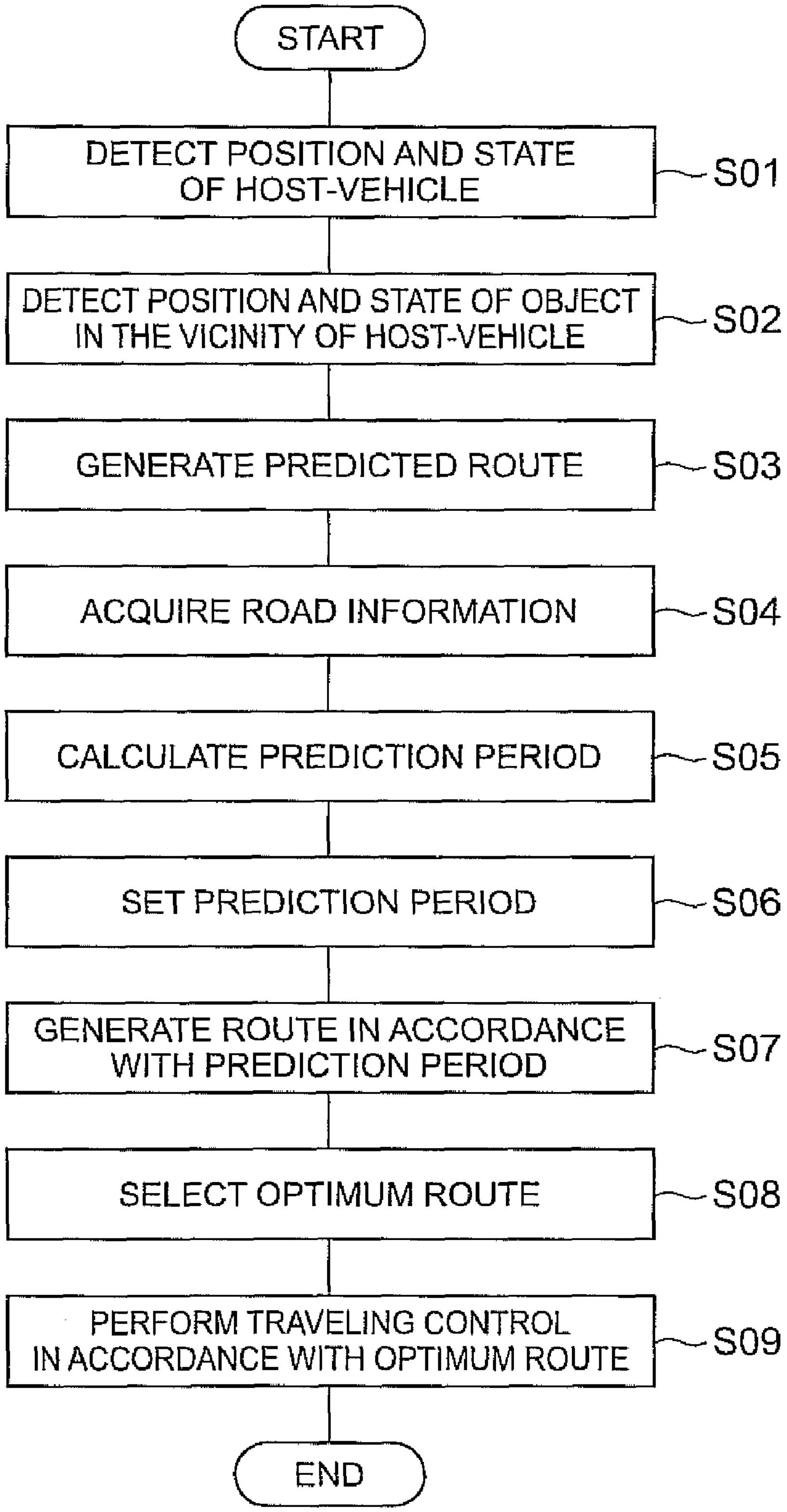
FIG. 3 is a flowchart showing an operation in the traveling assistance device of FIG. 1.

Next, the operation of the traveling assistance device 10 will be described with reference to FIG. 3. FIG. 3 is a flowchart showing a flow of characteristic processing which is executed by the traveling assistance device 10.

First, the vehicle state detection section 2 acquires the state (position, speed, and the like) of the host-vehicle 81 (S01). Then, the vehicle state detection section 2 outputs the acquired information to the vehicle control ECU 6.

Next, the environmental situation acquisition section 3 acquires the position and state of another object in the vicinity of the host-vehicle 81 (S02), and outputs the acquired information to the vehicle control ECU 6. Hereinafter, it is assumed that the position of another object is the value regarding the center of another object, and the state of another object is specified by the position, speed, and the like.

Next, the host-vehicle position prediction section 61 predicts the state of the host-vehicle 81, such as the future position, speed, direction, and the like, from information regarding the state of the host-vehicle 81, such as the position, speed, direction, and the like, input from the vehicle state detection section 2. For example, as shown in FIG. 4, at the time of traveling on a road A where a right turn is possible, the host-vehicle position prediction section 61 generates a predicted route $a_1$ for traveling in a straight line on the road A and a predicted line $a_2$ for a right turn on the road A (S03).

Next, the prediction period setting section 62 acquires road information including traffic rules from the road information acquisition section 4 (S04). That is, the following description will be provided assuming that the prediction period setting section 62 acquires, from the road information acquisition section 4, information such as "another vehicle 82 which is traveling along a main line (region A2) has a traveling priority higher than the host-vehicle 81 which turns right".

The prediction period setting section 62 calculates the prediction period T on the basis of the road information acquired in Step S04 and the predicted routes $a_1$ and $a_2$ acquired by the host-vehicle position prediction section 61 (S05). Specifically, the prediction period setting section 62 calculates prediction periods T1 and T2 for the respective predicted routes $a_1$ and $a_2$ shown in FIG. 4. In this case, the prediction period setting section 62 calculates the prediction periods T1 and T2 so as to prevent prediction from being terminated in a state of being deviated from the traffic rules. The predicted route $a_2$ will be described as an example. As described above, the prediction period setting section 62 calculates the prediction period T2 so as to be predictable until the host-vehicle 81 moves to a position where the region A2 is completely passed. At this time, the prediction period setting section 62 calculates a crossing time on the basis of the host-vehicle speed v detected by the vehicle state detection section 2, and calculates the prediction period T2 on the basis of the crossing time. Meanwhile, with regard to the predicted route $a_1$, the host-vehicle 81 is not deviated from the traffic rules. In this case, a prediction period T0 (for example, 5 seconds) set in advance is set as the prediction period T1.

Next, the prediction period setting section 62 statistically processes the prediction periods T1 and T2 for a plurality of predicted routes to calculate the prediction period T. With regard to the statistical processing, the maximum value, the minimum value, the average value, the medium value, and the like may be used, and in consideration of safety, the maximum value is preferably acquired. For example, when the prediction period T2 of the predicted route $a_2$ is longer than the prediction period T1 of the predicted route $a_1$, the prediction period T2 of the predicted route $a_2$ is set as the period (prediction period T) when the route generation section 63 generates a route (S06).

Figure 5:
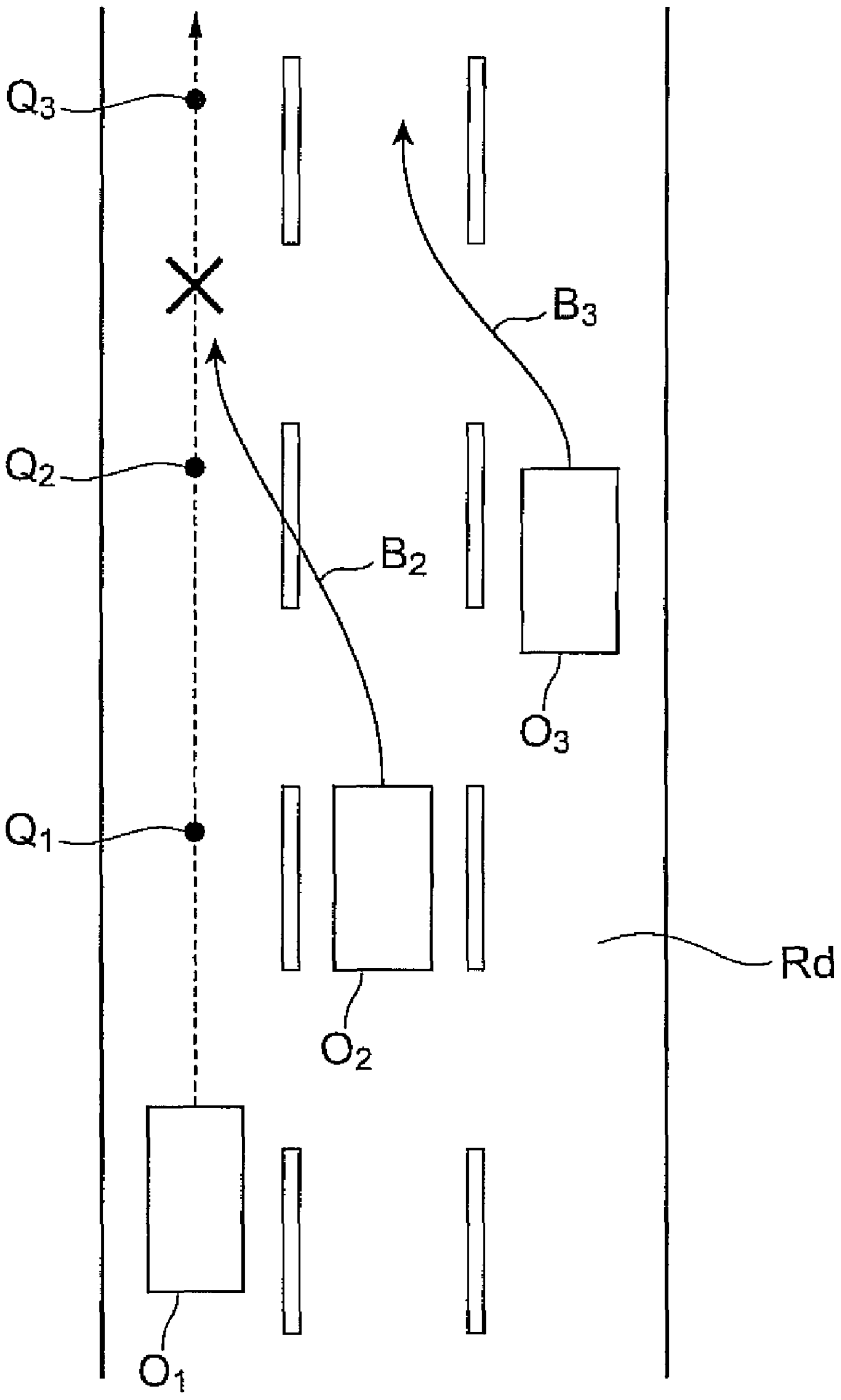
FIG. 5 is a diagram schematically showing the problem of a route prediction arithmetic operation of the related art.

When an arithmetic operation is carried out to generate a route in the following step, it is technically important that a prediction arithmetic operation is terminated in a predetermined period, without depending on whether or not the host-vehicle 81 reaches a location (a destination or an intermediate location similar to the destination) set in advance. In general, there is no location on a road where safety is ensured in advance. For example, as shown in FIG. 5, when it is predicted that a host-vehicle $O_1$ which is traveling on a three-lane road $R_d$ sequentially reaches locations $Q_1$, $Q_2$, and $Q_3$ set in advance, taking into consideration a case where the host-vehicle $O_1$ substantially travels in a straight line along the same lane toward the set locations, if another vehicle $O_3$ takes a route $B_3$, another vehicle $O_2$ may take a route $B_2$ to avoid risk and may enter a lane on which the host-vehicle $O_1$ is traveling. Thus, in the case of the route prediction arithmetic operation of the related art, it is not guaranteed in advance that the host-vehicle $O_1$ will travel safely toward the locations set in advance.

Figure 6:
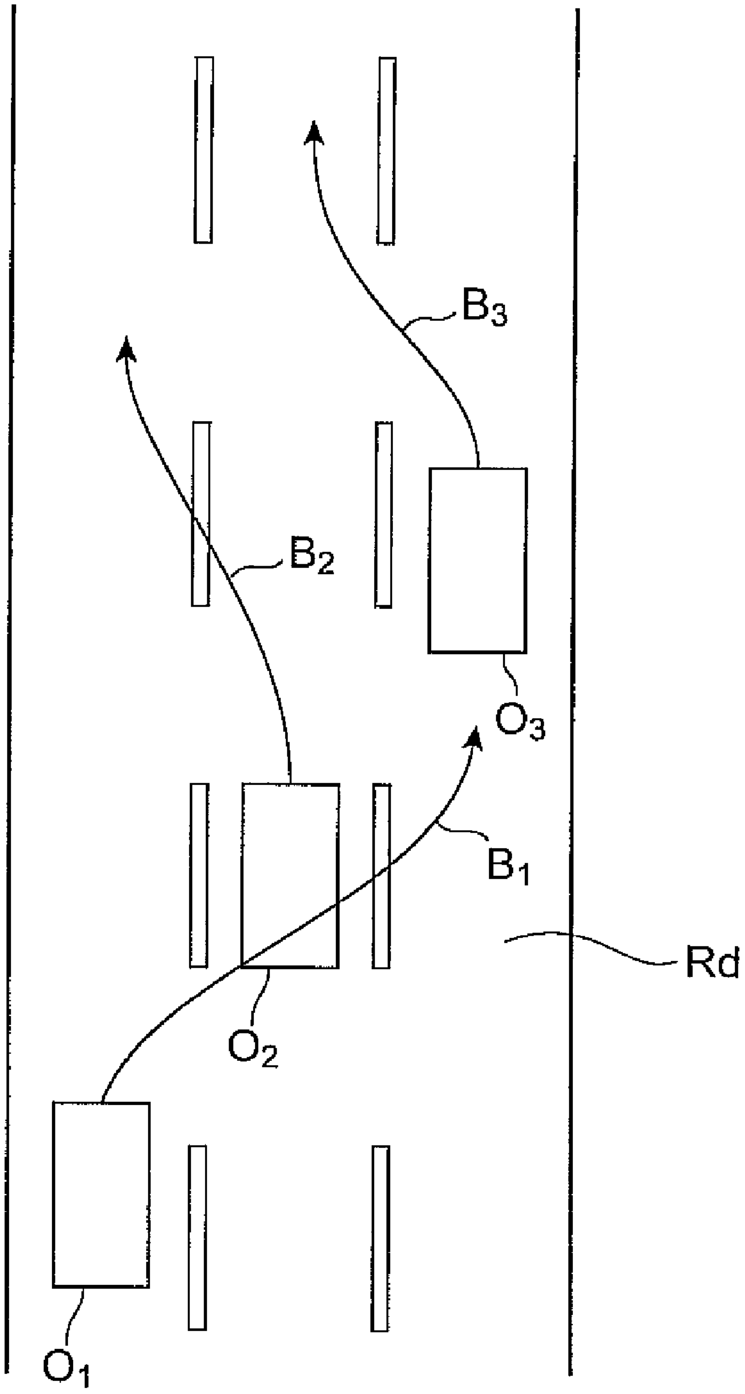
FIG. 6 is a diagram schematically showing the advantage of a route prediction arithmetic operation in an interference evaluation method of the traveling assistance device of FIG. 1.

In this embodiment, since an optimum route is determined every time, instead of determining a location, such as a destination, to be reached by the host-vehicle $O_1$, for example, a route $B_1$ shown in FIG. 6 can be selected as the route of the host-vehicle $O_1$ under the same situation as FIG. 5, and risk can be avoided at the time of traveling of the host-vehicle $O_1$, thereby ensuring safety.

Next, the route generation section 63 generates the spatiotemporal route of each object on the basis of the prediction period T set in S06 (S07). In generating the route, it is assumed that the total number of objects (including the host-vehicle) acquired by the environmental situation acquisition section 3 is K, and an arithmetic operation is carried out $N_k$ times to generate the route of an object $O_k$ (where $1 \leqq k \leqq K$, k is a natural number) (in this way, k and $N_k$ are all natural numbers). It is also assumed that the period (prediction period) in which a route is generated is T (>0). The route may be calculated by a known method, for example, a method described in Japanese Unexamined Patent Application Publication No. 2007-230454. The route generation method is not limited to this method.

Next, the vehicle control ECU 6 selects an optimum route on the basis of, for example, the probability of a route to be taken by each object and the interference degree between the host-vehicle 81 and another vehicle 82 (S08). In Step S08, a specific optimum route can be selected on the basis of the contents described in Japanese Unexamined Patent Application Publication No. 2007-230454, for example. The optimum route determination method is not limited to this method.

Next, the traveling assistance section 7 carries out driving of the host-vehicle 81, for example, traveling drive, a braking operation, and a steering operation in accordance with the optimum route selected in Step S08 (S09).

As described above, according to the environment prediction device 1 of this embodiment, the prediction period T is set on the basis of the road information acquired by the road information acquisition section 4 and the position of the host-vehicle 81 acquired by the host-vehicle position prediction section 61. In this embodiment, the prediction period setting section 62 calculates the prediction period T such that position prediction is not terminated while the host-vehicle 81 is deviated from the traffic rules. Thus, it is possible to prevent prediction from being terminated in a state where the host-vehicle 81 interferes with the route of another vehicle 82, and it is possible to acquire information regarding the behavior of an object in the vicinity of the host-vehicle for appropriate traveling situations.

Although the first embodiment of the invention has been described, the invention is not limited to the foregoing embodiment, and various modifications may be made without departing from the scope and spirit of the invention.

According to the environment prediction device 1 of the foregoing embodiment, an example has been described where the prediction period setting section 62 acquires the position of the host-vehicle 81 obtained from the host-vehicle position prediction section 61 without taking into consideration presence/absence of an obstacle in the traveling direction of the host-vehicle 81. However, this embodiment is not limited thereto. For example, the prediction period setting section 62 may set a prediction period T3 on the basis of the position and state of an obstacle in the vicinity of the host-vehicle 81 detected by the environmental situation acquisition section 3.

Figure 7:
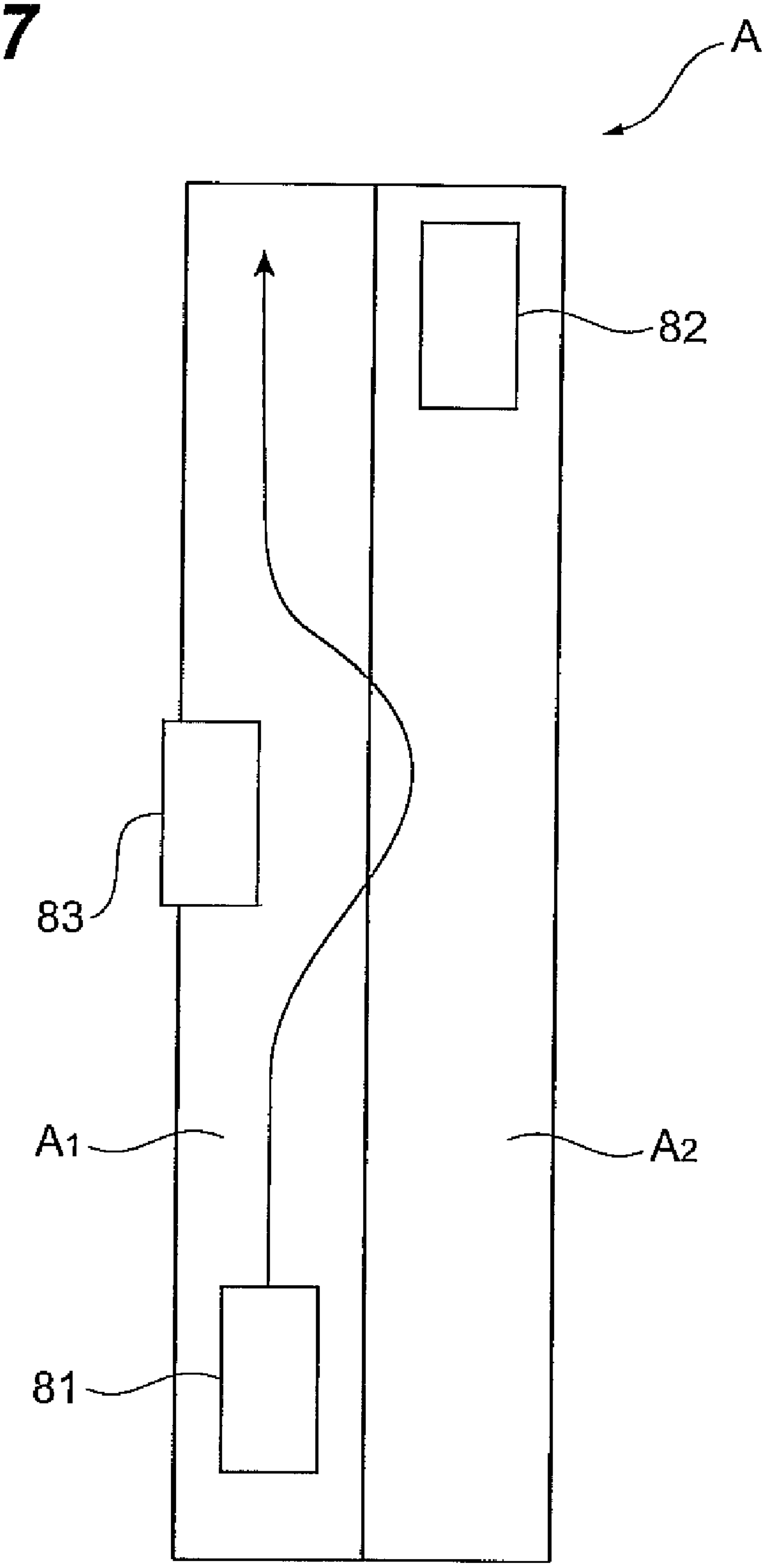
FIG. 7 is a diagram showing a predicted route in consideration of an obstacle which is acquired by the host-vehicle position prediction section of FIG. 1.

Hereinafter, the method of setting the prediction period T3 using information regarding the obstacle will be described specifically with reference to FIG. 7. FIG. 7 shows a case where a vehicle (obstacle) 83 is parked in the traveling direction of the host-vehicle 81 on a single-opposing-lane road A. In this case, the environmental situation acquisition section 3 acquires the position and size of the parked vehicle 83. At this time, the position of the parked vehicle 83 is not necessarily strict coordinate information, but may be, for example, information regarding a region (A1 or A2) where the parked vehicle 83 is present. Then, taking into consideration that the parked vehicle 83 is present in the traveling direction, the prediction period setting section 62 calculates the prediction period T3 by adding a predetermined avoidance time (a time for simply avoiding or avoiding while reducing the speed) to the prediction period T when there is no obstacle, for example.

As described above, the prediction period T3 is calculated in consideration of an obstacle, such that it is possible to cope with a dynamic traffic situation, and it is possible to calculate the prediction period T3 so as to prevent prediction from being terminated in a state of being deviated from the traffic rules.

According to the environment prediction device 1 of the foregoing embodiment, an example has been described where the prediction period setting section 62 sets the prediction period T on the basis of the host-vehicle speed v detected by the vehicle state detection section 2, but the prediction period T may be set on the basis of the average acceleration of the host-vehicle 81 after stopping at the time of a right turn.

Second Embodiment

Figure 8:
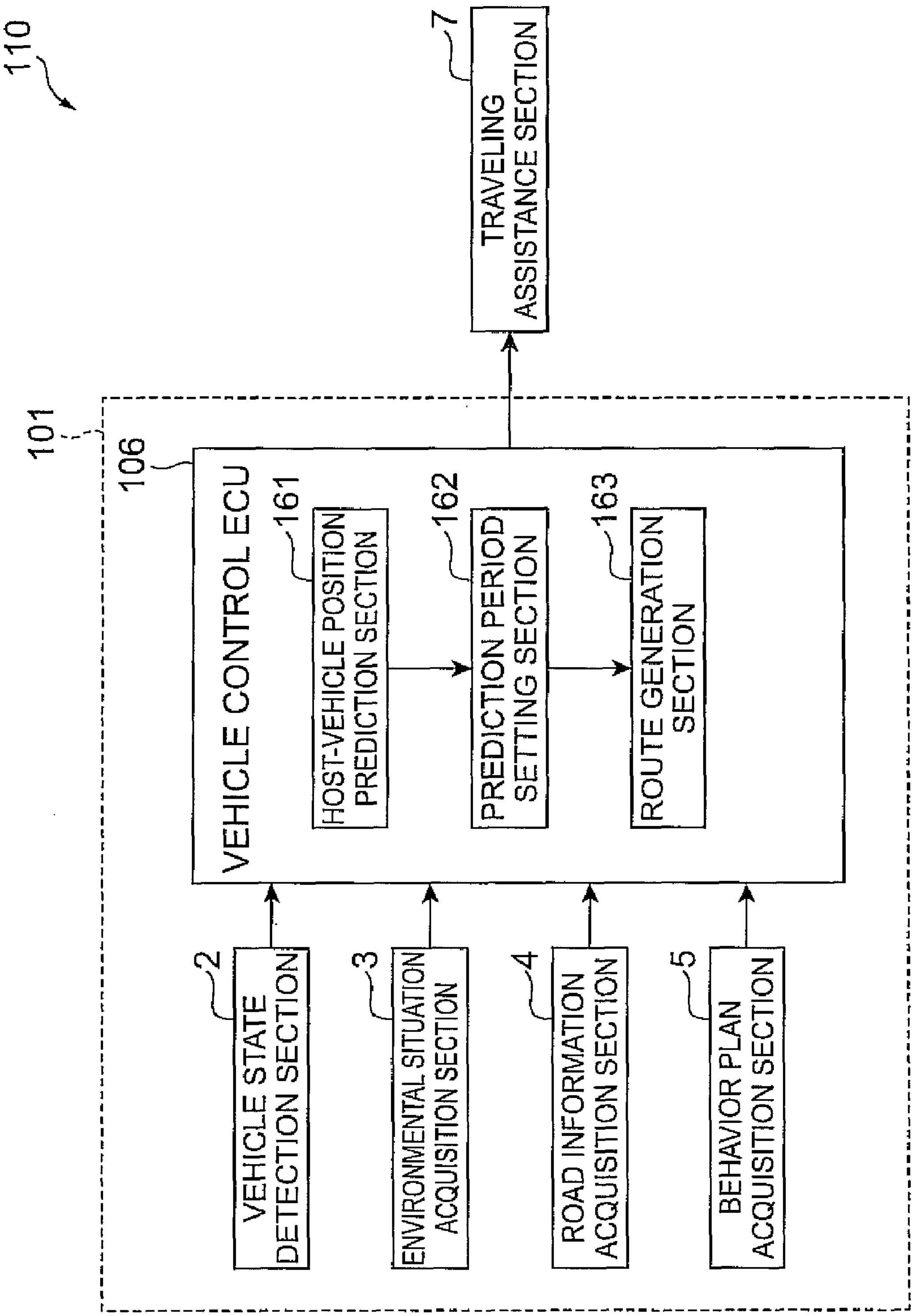
FIG. 8 is a block diagram showing the functional configuration of a traveling assistance device including an environment prediction device according to a second embodiment of the invention.

As shown in FIG. 8, an environment prediction device 101 may include a behavior plan acquisition section (behavior plan acquisition unit) 5, in addition to the configuration of FIG. 1. The environment prediction device 101 will be described specifically with reference to FIGS. 8 to 15. FIG. 8 is a block diagram showing the functional configuration of a traveling assistance device 110 including the environment prediction device 101 described below.

The behavior plan acquisition section 5 acquires a behavior plan of the host-vehicle 81. For example, a navigation system or the like corresponds to the behavior plan acquisition section 5. Then, a host-vehicle position prediction section 161 predicts the position of the host-vehicle 81 on the basis of a destination path input to the navigation system. Specifically, the host-vehicle position prediction section 161 generates a target waypoint w shown in FIG. 9 or 10 on the basis of the destination path. Here, the target waypoint w generated by the host-vehicle position prediction section 161 on the basis of the destination path acquired by the behavior plan acquisition section 5 will be described.

Figure 9:
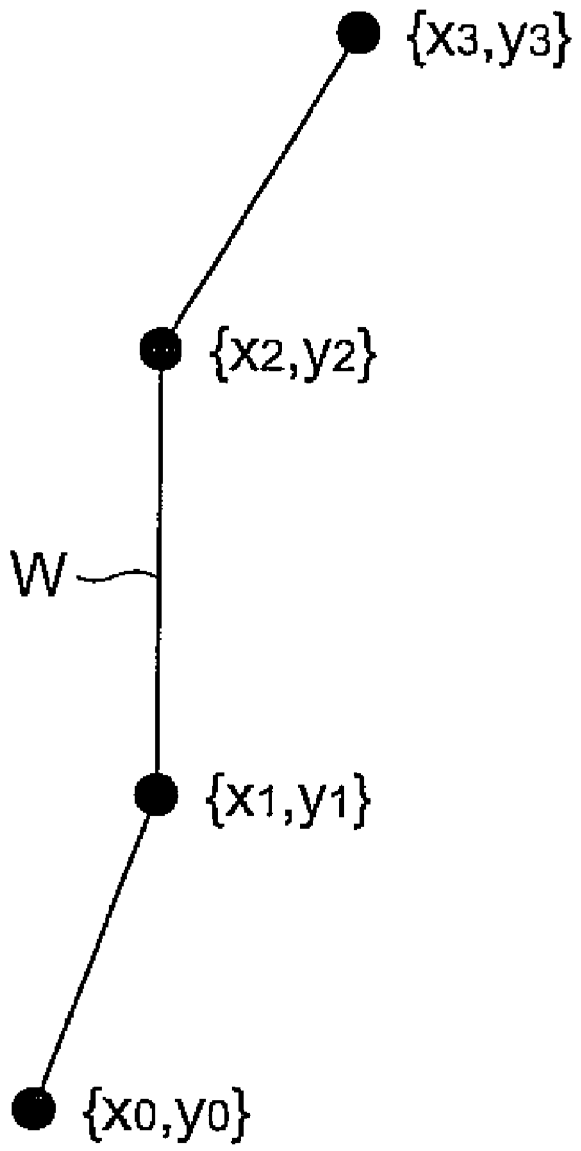
FIG. 9 is a diagram illustrating a target waypoint which is generated by a prediction period setting section of FIG. 8.
Figure 10:
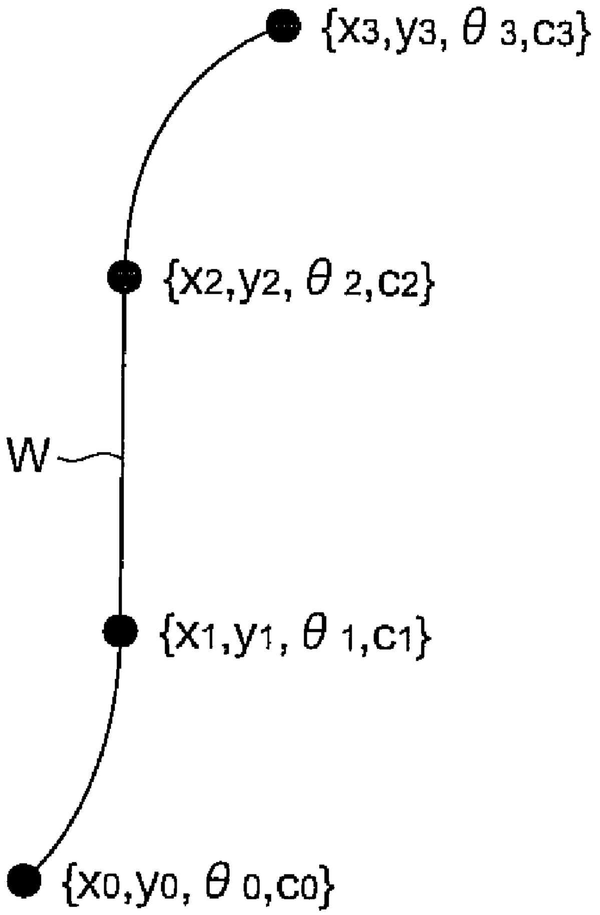
FIG. 10 is a diagram illustrating a target waypoint which is generated by the prediction period setting section of FIG. 8.
Figure 11:
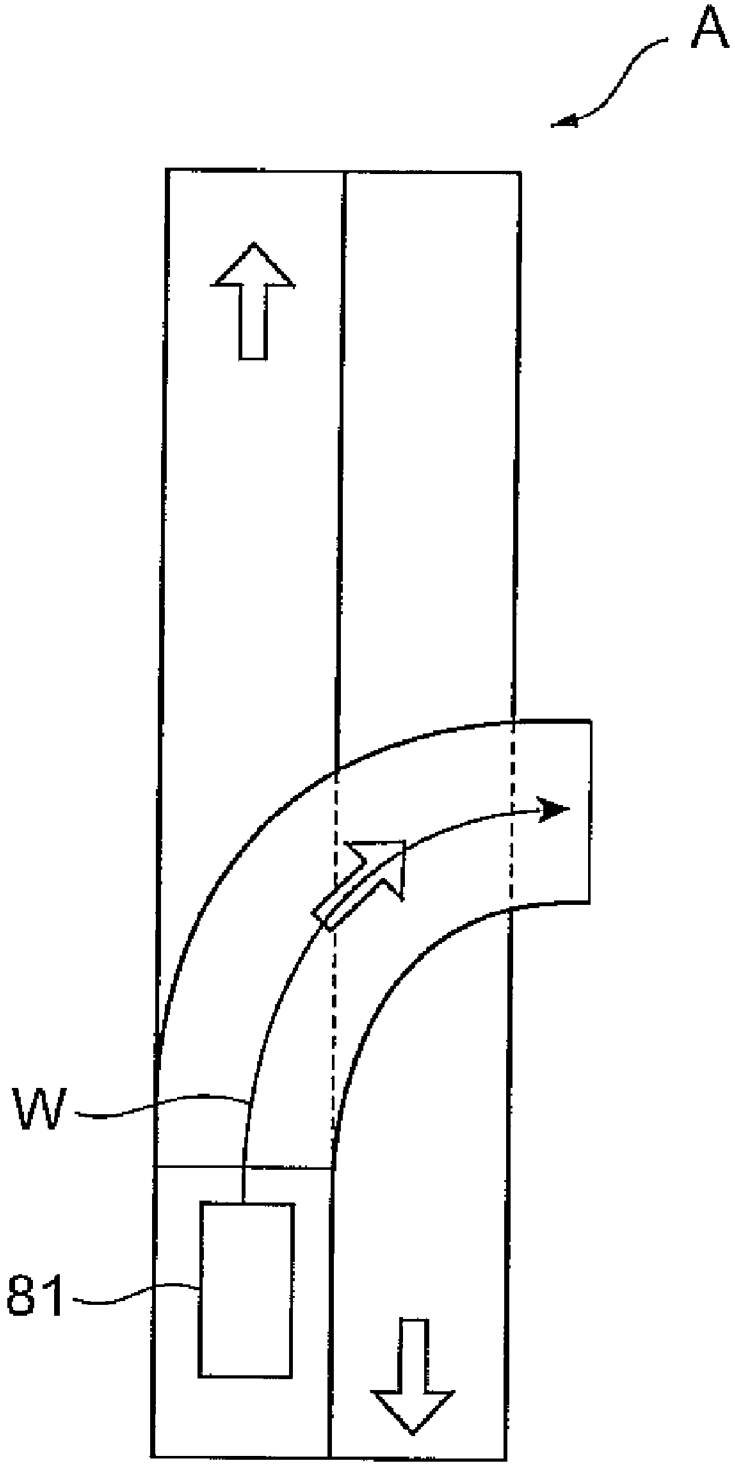
FIG. 11 is a diagram illustrating a target waypoint which is generated by the prediction period setting section of FIG. 8.
Figure 12:
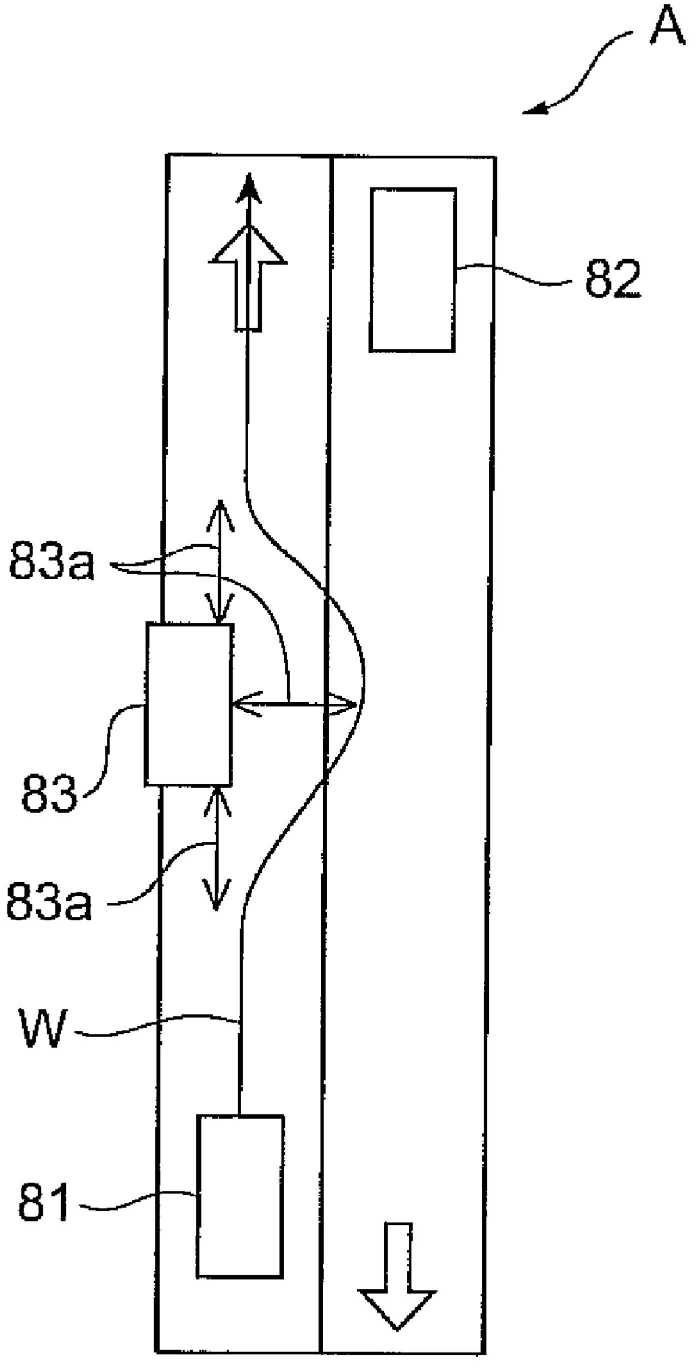
FIG. 12 is a diagram illustrating a target waypoint which is generated by the prediction period setting section of FIG. 8.

A waypoint refers to a concept including a path, and in particular, specifies a position on the path. That is, the target waypoint w is sequence data of $\{x_n,y_n\}$, and is, for example, data shown in FIG. 9 or 10. Simply, as shown in FIG. 9, the target waypoint w is sequence data of only {x,y}, and points are interpolated linearly. In addition, points may be interpolated as $\{x_n, y_n, \theta_n, c_n\}$ (x, y, the direction, and the change rate of the direction) shown in FIG. 10. In particular, in the case of interpolation shown in FIG. 10, the number of points in a curve can be reduced, and data capacity can be reduced. Any processing may be carried out to convert data of FIG. 9 into data of FIG. 10, and then interpolation may be made. As the specifically generated target waypoint w, FIG. 11 shows a target waypoint w where a right turn is made on the road A, or FIG. 12 shows a target waypoint w where the parked vehicle (obstacle) 83 is avoided. The target waypoint w shown in FIG. 12 is generated by modifying the destination path acquired by the behavior plan acquisition section 5 in accordance with a predetermined margin 83*a* with respect to the parked vehicle 83. When the host-vehicle position prediction section 161 generates the above-described target waypoint w, it is assumed that the parked vehicle 83 is continuously stationary.

The target waypoint w is preferably generated so as to necessarily passes through one specific point of the host-vehicle 81. It should more suffice that the one specific point is the movement center (for example, in the case of a rear-wheel-drive vehicle, the center of the rear wheel shaft) or the center of the host-vehicle 81. The start point of the target waypoint w is preferably the current position of the host-vehicle 81. When this happens, it is possible to perform calculation such that the host-vehicle 81 necessarily moves the target waypoint w. However, if the shift between the position of the host-vehicle 81 and the target waypoint w is, for example, equal to or less than 0.1 m, the position of the foot of a perpendicular line from the host-vehicle 81 to the target waypoint w may be the position of the host-vehicle 81 on the target waypoint w. When this happens, even when the position of the host-vehicle 81 is shifted from the target waypoint w, if the shift amount is equal to or less than a predetermined amount, it is not necessary to recalculate the target waypoint w. In addition, the end point of the target waypoint w is preferably the destination of the host-vehicle 81. If the destination is far away, the end point of the target waypoint w may be a way stop or an intermediate destination.

As described above, the host-vehicle position prediction section 161 predicts the position of the host-vehicle 81 on the basis of the selectively generated target waypoint w, unlike the predicted routes $a_1$ and $a_2$ which are exhaustively generated as described in the foregoing embodiment.

Hereinafter, the operation of the environment prediction device 1 having the host-vehicle position prediction section 161, which predicts the position of the host-vehicle 81 on the basis of the target waypoint w, will be described with reference to a flowchart of FIG. 13.

First, the vehicle state detection section 2 acquires the state (position, speed, and the like) of the host-vehicle 81 (S11). Then, the vehicle state detection section 2 outputs the acquired information to the vehicle control ECU 6.

Next, the environmental situation acquisition section 3 acquires the position and state of the parked vehicle (obstacle) 83 which is located in the traveling direction of the host-vehicle 81 (S12), and outputs the acquired information to the vehicle control ECU 6.

Next, the host-vehicle position prediction section 161 generates the target waypoint w on the basis of information regarding the state of the host-vehicle 81, such as the position, speed, direction, and the like, input from the vehicle state detection section 2 and the destination path which can be acquired from the behavior plan acquisition section 5 (S13). At this time, for example, the host-vehicle position prediction section 161 generates the target waypoint w for avoiding the parked vehicle 83 shown in FIG. 12.

Next, the prediction period setting section 162 acquires road information including traffic rules from the road information acquisition section 4 on the basis of the target waypoint w (S14).

Next, the prediction period setting section 162 calculates a prediction period T4 on the basis of the road information acquired in Step S14 and the target waypoint w acquired by the host-vehicle position prediction section 161 (S15). Specifically, the prediction period T4 is calculated in accordance with a flowchart of FIG. 14.

Figure 14:
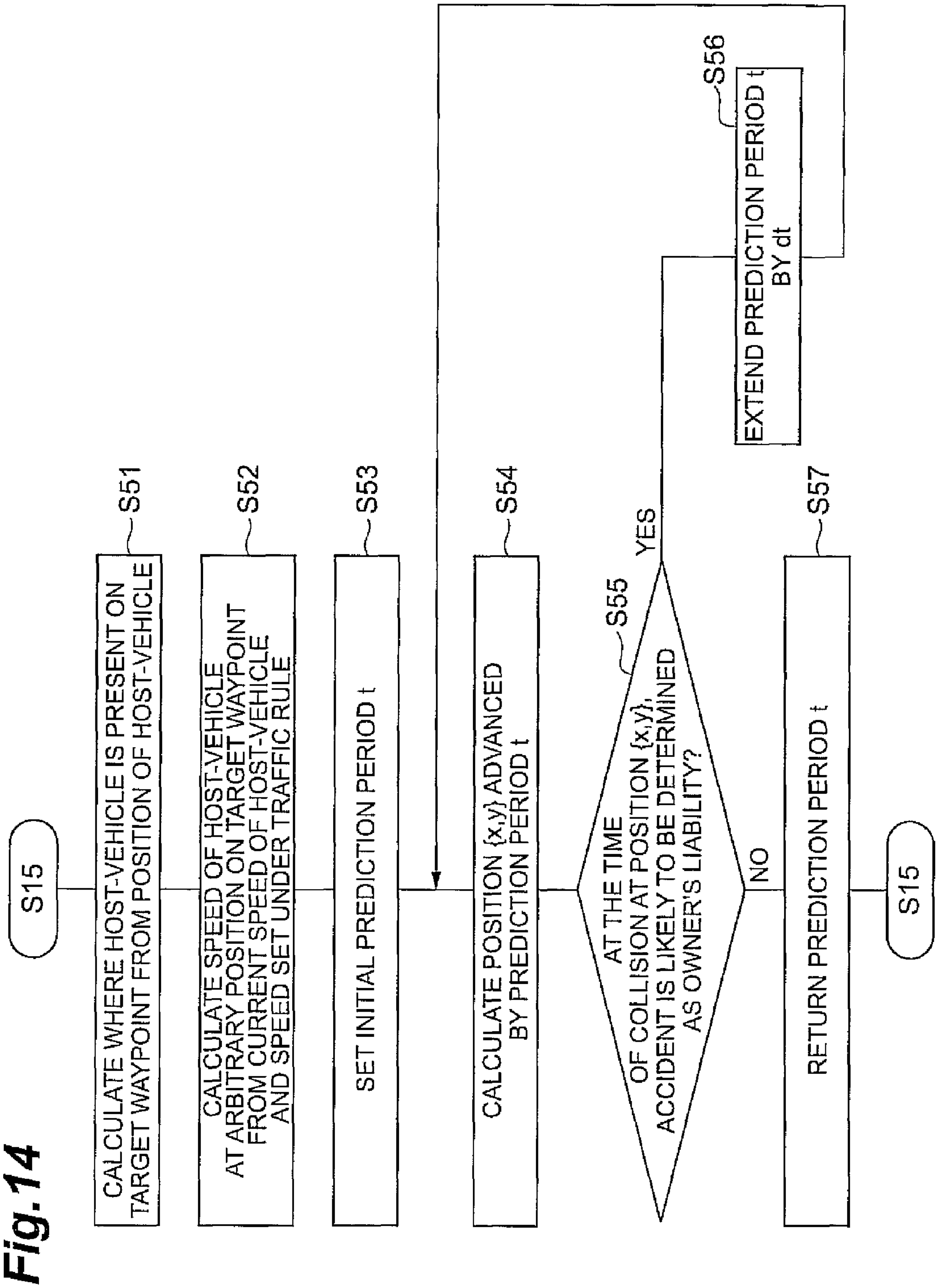
FIG. 14 is a flowchart showing an operation in the prediction period setting section of FIG. 8.

First, as shown in FIG. 14, the prediction period setting section 162 calculates the position of the host-vehicle 81 on the target waypoint w (S51). Here, when the position of the host-vehicle 81 is not on the target waypoint w (there is a predetermined shift), the perpendicular line is taken down from the position of the host-vehicle 81 with respect to the traveling direction on the target waypoint w, and the intersection between the perpendicular line and the target waypoint w is set as the position of the host-vehicle 81.

Next, the host-vehicle speed v at an arbitrary position on the target waypoint w is calculated (S52). The host-vehicle speed v is calculated taking into consideration traffic rules or ride quality of the host-vehicle 81 with no interference with an obstacle, such as the parked vehicle 83. However, when an invisible region (dead zone) is present on the target waypoint w, it is preferable to take into consideration objects coming out from the invisible region. Thus, the host-vehicle speed v calculated at this time becomes the speed at which the end position of the target waypoint w can be reached fastest. The host-vehicle position prediction section 161 calculates the host-vehicle speed v by using at least the current speed of the host-vehicle 81 which can be acquired from the vehicle state detection section 2 and the speed limit of the region A1 where the host-vehicle 81 is traveling. The calculation by the host-vehicle position prediction section 161 is preferably carried out taking into consideration the curvature of the target waypoint w and the change rate of the curvature. Therefore, the host-vehicle speed v can be calculated also in consideration of the ride quality.

Figure 15:
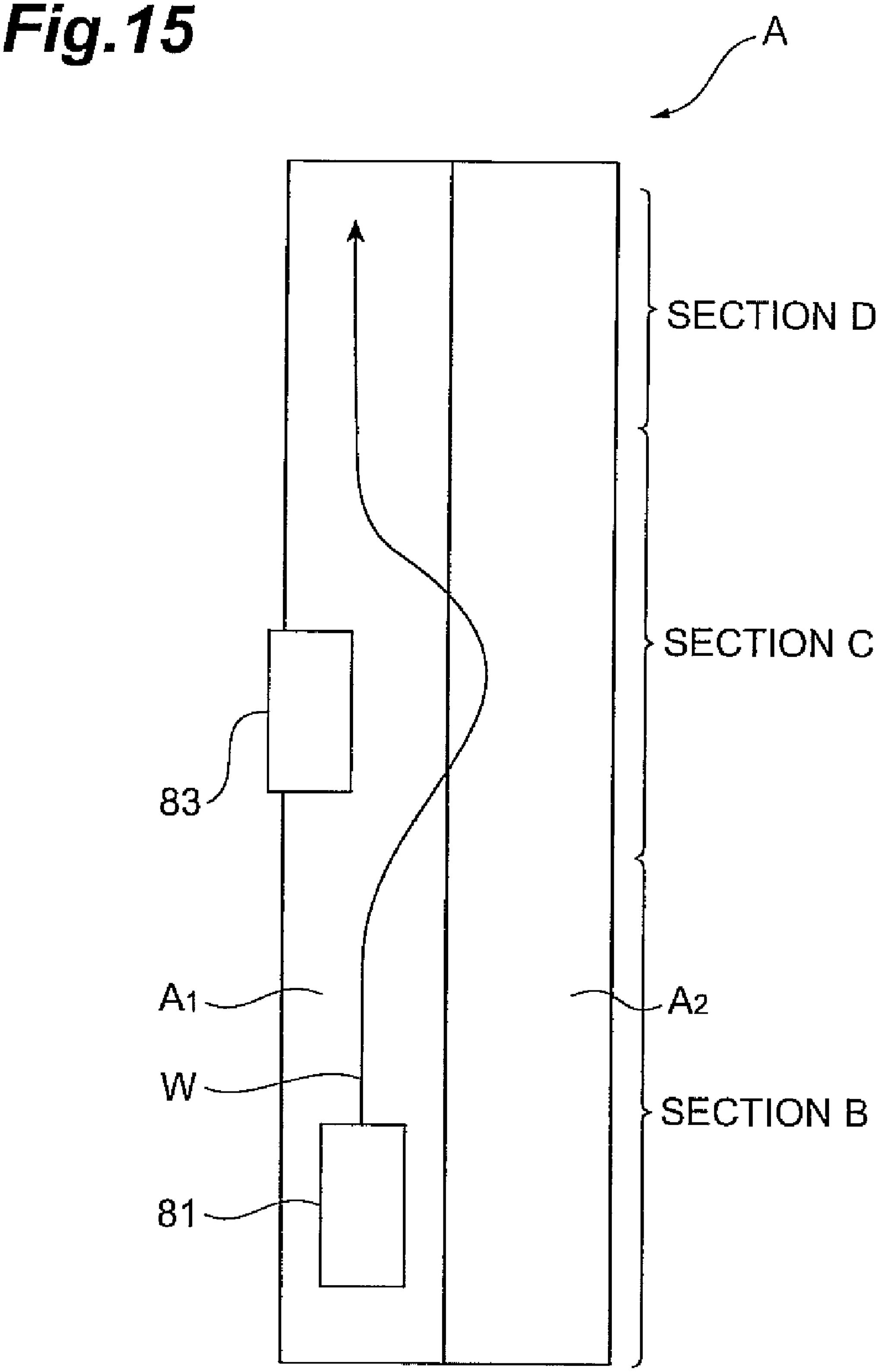
FIG. 15 is a diagram illustrating a calculation method of the speed of a host-vehicle of FIG. 13.

The specific calculation method of the host-vehicle speed v will be described with reference to FIG. 15. In sections B and D (linear section), if the host-vehicle speed v is equal to or less than the speed limit, the host-vehicle 81 is accelerated to the speed limit. If the host-vehicle speed v of the host-vehicle 81 reaches the speed limit, the host-vehicle 81 moves uniformly at that speed, and if the host-vehicle speed v exceeds the speed limit, the host-vehicle 81 is decelerated to the speed limit. Next, in a section C, the curvature of a curve and the change rate of the curvature are reflected in the speed. The reflection is made such that, as the curvature is smaller, the speed is reduced. Further, as the change rate of the curvature is larger, the speed is reduced. Preferably, the maximum steering speed of the host-vehicle 81 which does not interfere with the ride quality is predetermined and decelerated to the relevant speed. When an invisible region (dead zone) is present on the target waypoint w, it is preferable to decelerate the speed to a speed at which the host-vehicle 81 can be stopped at the time of an object coming out from the invisible region. Hereinafter, the prediction period T4 is calculated on the basis of the host-vehicle speed v calculated by the above-described method.

Next, the prediction period setting section 162 sets an initial prediction period t (S53). With regard to the initial prediction period t, the prediction period setting section 162 sets the minimum initial prediction period t so as to ensure safety. Specifically, the initial prediction period t is preferably 1 second to 3 seconds. Further, the initial prediction period t is preferably changed in accordance with the current speed of the host-vehicle 81. That is, the maximum deceleration which does not interfere with the ride quality is predetermined, and the initial prediction period t is set on the basis of a period tr necessary for stopping the host-vehicle 81, which is currently traveling at the host-vehicle speed v, by the relevant deceleration. In contrast, when the initial prediction period t is longer than the period tr necessary for stopping the host-vehicle 81, which is currently traveling at the host-vehicle speed v, by the relevant deceleration (period ts), the period tr may be set as the initial prediction period t.

Next, the prediction period setting section 162 calculates a position {x,y} advanced by the initial prediction period t (S54). In this case, since the coordinates on the target waypoint w, the host-vehicle speed v on an arbitrary target waypoint w, and the traveling time t are known, the position {x,y} on the target waypoint w after the initial prediction period t seconds can be calculated by simple integration. It is preferable to obtain the direction θ of the host-vehicle 81 in advance.

Next, the prediction period setting section 162 determines whether or not the host-vehicle 81 is likely to interfere with the route of another vehicle 82 on the target waypoint w (S55). In this case, when another vehicle 82 is located in the region A2 different from the region A1 where the host-vehicle 81 is traveling, it is determined that the host-vehicle 81 is likely to interfere with the route of another vehicle 82. As described below, the determination method of the possibility of interference with the route of another vehicle 82 is not limited thereto.

When the prediction period setting section 162 determines that the host-vehicle 81 is likely to interfere with the route of another vehicle 82 on the target waypoint w (S55: YES), the prediction period setting section 162 adds a period dt to the initial prediction period t (S56). The period dt may be a fixed period (for example, 0.2 seconds) or may be a variable period (for example, 0.01 to 1.0 seconds). The period dt preferably increases/decreases in accordance with the load of calculation processing. That is, when the computational load is large, a roughly large period dt is set, and when the computational load is small, a fine and small period dt is set, such that real-time processing can be realized.

Meanwhile, when the prediction period setting section 162 determines that the host-vehicle 81 is unlikely to interfere with the route of another vehicle 82 on the target waypoint w (S55: NO), the period calculated in Step S54 is determined as the prediction period T4 (S57). The prediction period T4 is the minimum period for prediction of a position where the host-vehicle 81 is likely to interfere with the route of another vehicle 82.

Next, the prediction period setting section 162 sets the prediction period T4 determined in Step S56 as the time when the route generation section 163 generates a route (S16).

Figure 13:
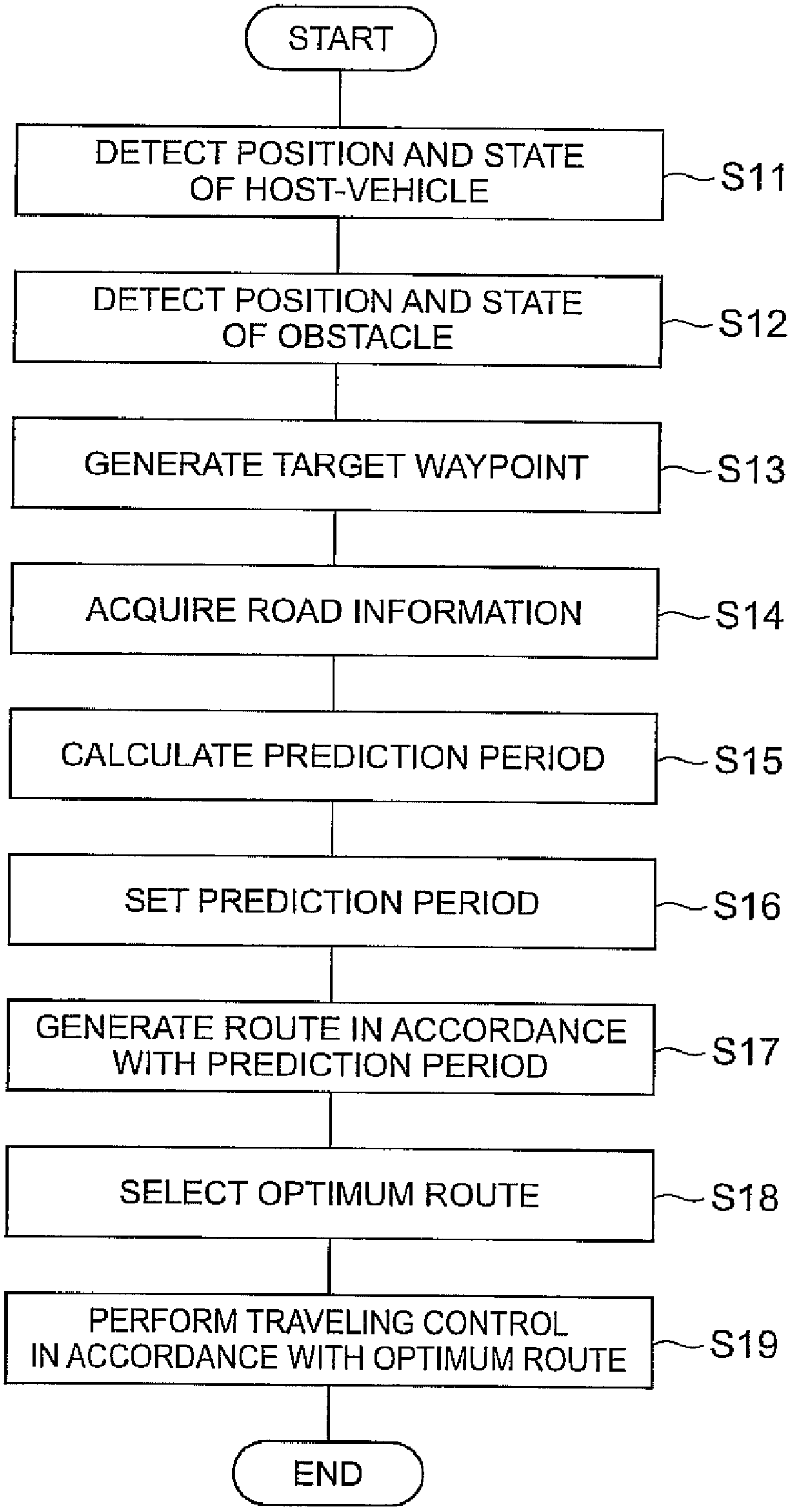
FIG. 13 is a flowchart showing an operation in the traveling assistance device of FIG. 8.

Hereinafter, Steps S17 and S19 shown in FIG. 13 are the same as those in the foregoing embodiment, and the description thereof will not be repeated.

As described above, according to the environment prediction device 101 of the foregoing embodiment, a route along which the host-vehicle 81 will travel becomes apparent, such that it is possible to reduce the computational load, in addition to the effects of the environment prediction device 1.

Although the first and second embodiments of the invention have been described, the invention is not limited to the foregoing embodiments, and various modifications may be made without departing from the scope and spirit of the invention.

According to the environment prediction device 101 of the foregoing embodiment, an example has been described where the possibility of interference with the route of another vehicle 82 is determined on the basis of the region at which the host-vehicle 81 is located. However, the invention is not limited to this example.

Figure 16:
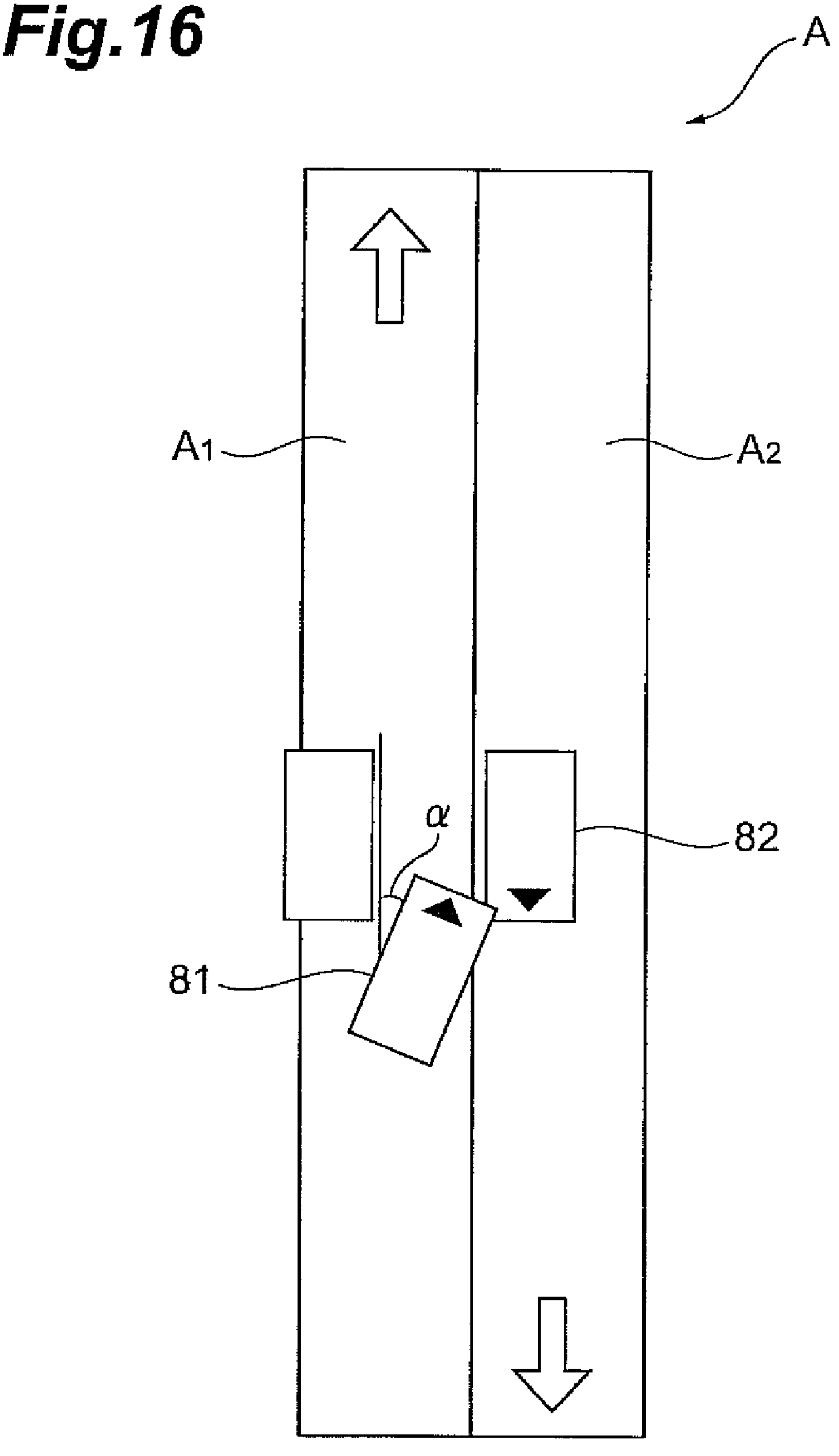
FIG. 16 is a diagram illustrating a possibility that a host-vehicle interferes with the route of another vehicle.

For example, as shown in FIG. 16, it may be determined whether the host-vehicle 81 is likely to interfere with the route of another vehicle 82 or not on the basis of an angle α between the direction of the host-vehicle 81 and the traveling direction of the region A1 where the host-vehicle 81 is located. For example, when the angle α between the direction of the host-vehicle 81 and the traveling direction of the region where the host-vehicle 81 is present is equal to or greater than a predetermined angle (for example, 45°), it may be determined that the host-vehicle 81 interferes with the route of another vehicle 82.

Figure 17:
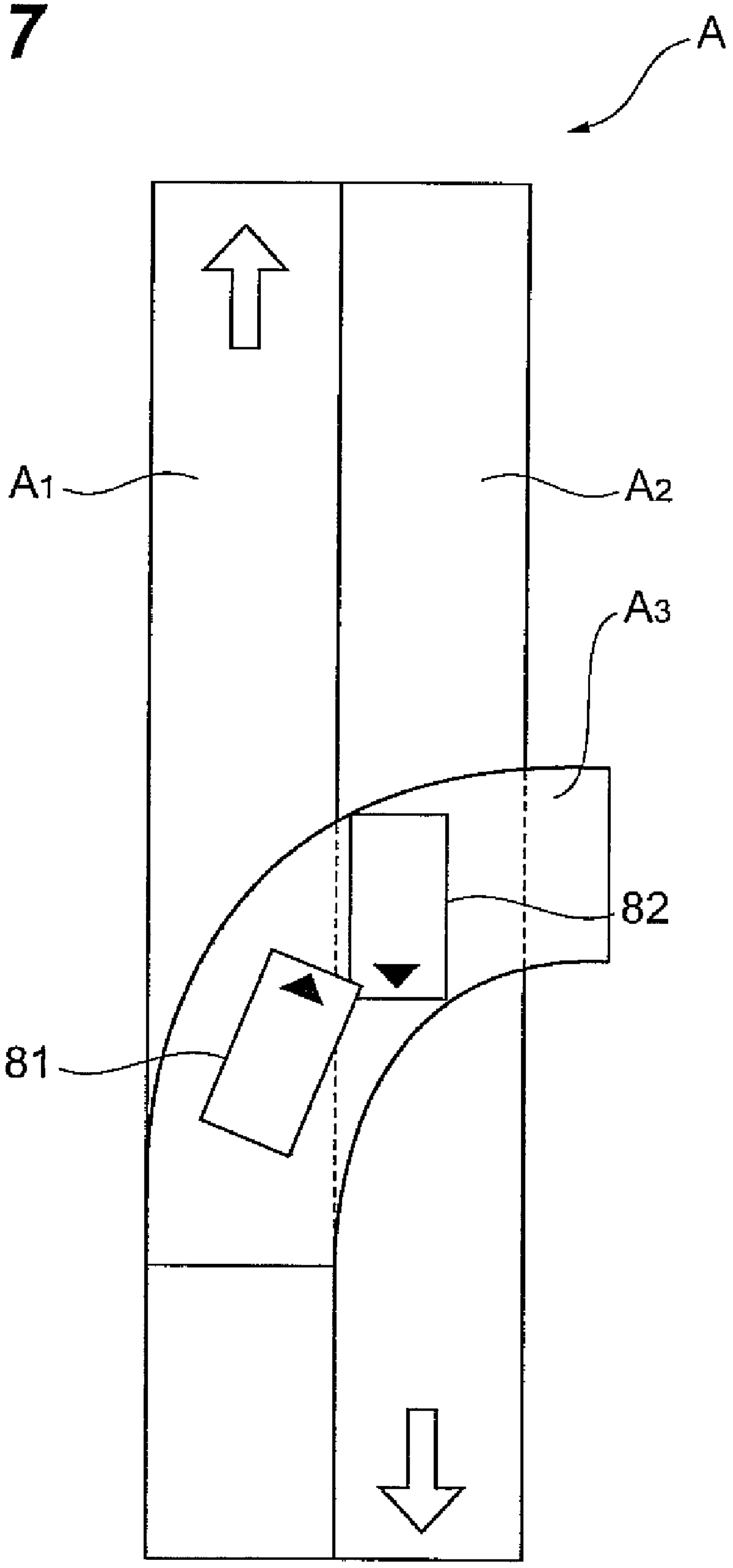
FIG. 17 is a diagram illustrating a possibility that a host-vehicle interferes with the route of another vehicle.
Figure 18:
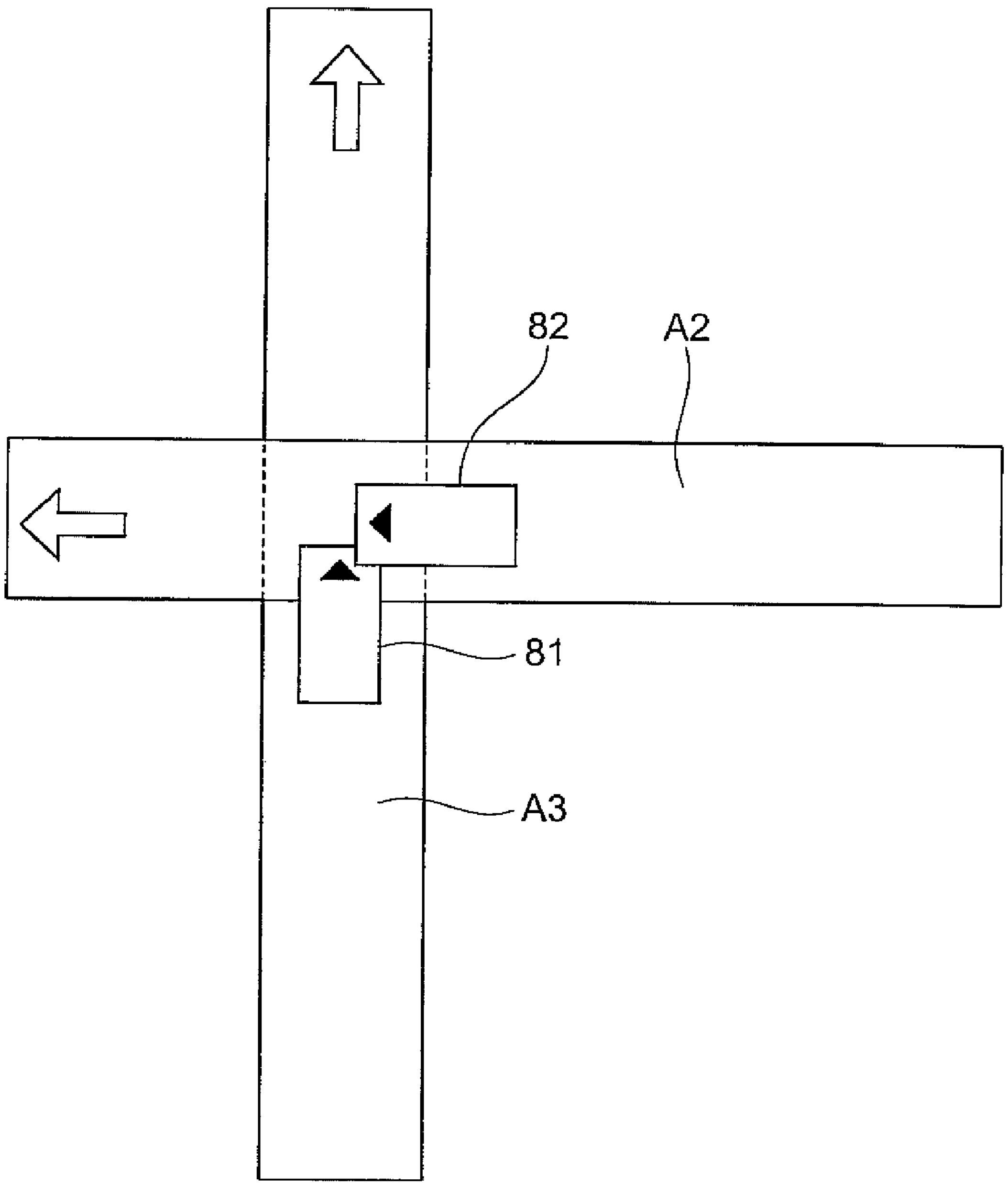
FIG. 18 is a diagram illustrating a possibility that a host-vehicle interferes with the route of another vehicle.

For example, as shown in FIG. 17, it may be determined whether the host-vehicle 81 is likely to interfere with the route of another vehicle 82 or not on the basis of the priority of the region A3 where the host-vehicle 81 is located and the priority of the region A2 where another vehicle 82 is located. For example, when the region A3 where the host-vehicle 81 is located has the priority lower than the region A2 where another vehicle 82 is located, it may be determined that the host-vehicle 81 interferes with the route of another vehicle 82. In comparison of the priorities of the region A3 where the host-vehicle 81 is located and the priority of the region A2 where another vehicle 82 is located, at an intersection shown in FIG. 18, it may be determined whether or not the host-vehicle 81 is likely to interfere with the route of another vehicle 82. The priority based on signal information as well as the priority based on the region where the host-vehicle 81 is located may be used. For example, a vehicle which runs into a green light has high priority, and a vehicle which runs into a red light has low priority.

Figure 19:
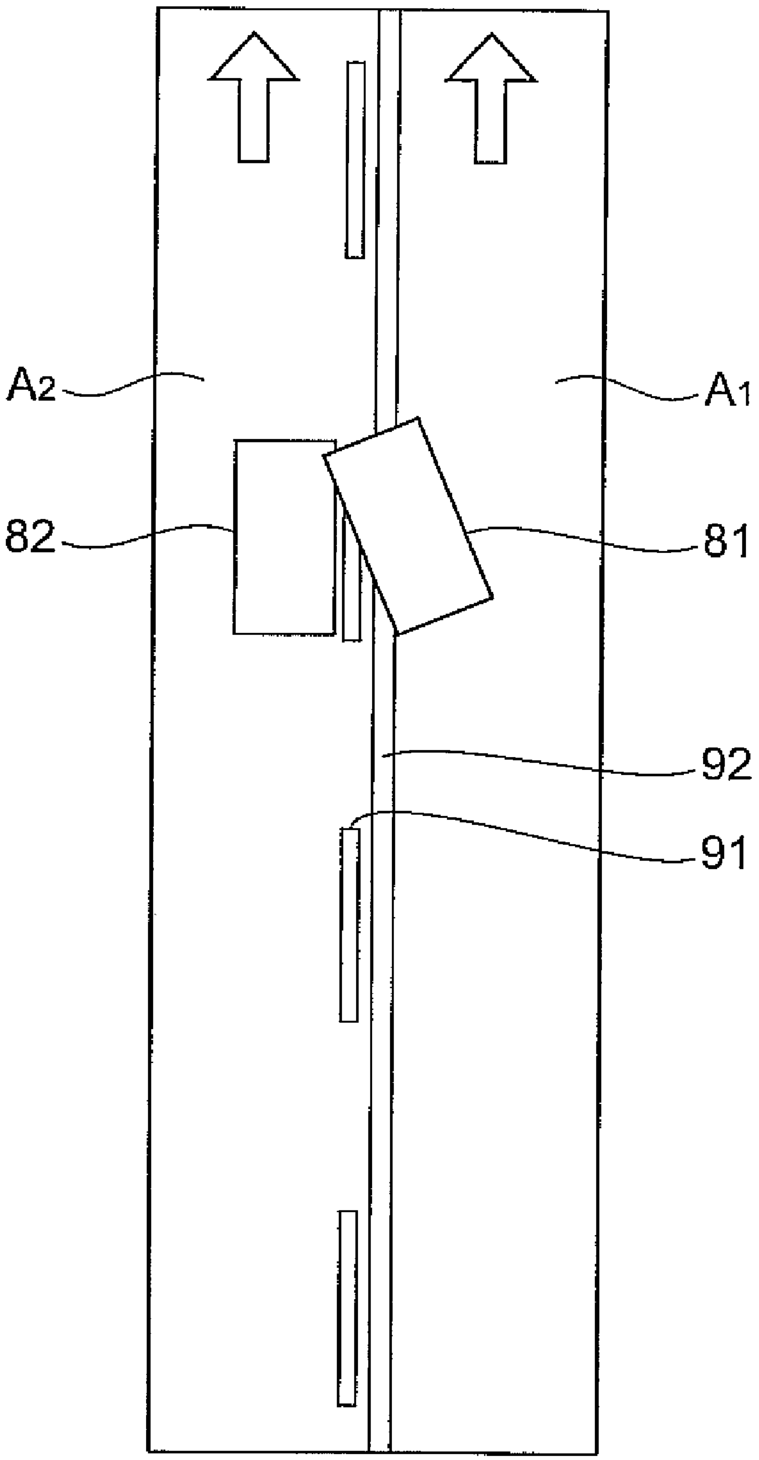
FIG. 19 is a diagram illustrating a possibility that a host-vehicle interferes with the route of another vehicle.

For example, as shown in FIG. 19, it may be determined whether the host-vehicle 81 is likely to interfere with the route of another vehicle 82 or not on the basis of road markings 91 and 92. When the road marking 91 is a white line and the road marking 92 is a yellow line, if the host-vehicle 81 which is traveling in a region A1 changes lane to a region A2, the host-vehicle 81 violates the traffic rule. With regard to such traveling which violates the traffic rule, it may be determined that the host-vehicle 81 interferes with the route of another vehicle 82. For the determination of violations against the traffic rule, road signs as well as road markings may be used.

The determination of interference with the route of another vehicle 82 may be made on the basis of the fault proportion of automobile insurance, the judicial precedents, the vehicle performance, and the like.

Although, according to the environment prediction devices 1 and 101 of the foregoing embodiments, an example has been described where, after the prediction period setting sections 62 and 162 set the prediction periods T and T4, the traveling assistance section 7 carries out traveling drive, a braking operation, and a steering operation, the invention is not limited to this example. For example, traveling assistance may be carried out such that the route and the like calculated on the basis of the prediction periods T and T4 are displayed on a display unit (display or the like).

Although, according to the environment prediction devices 1 and 101 of the foregoing embodiments, an example has been described where the prediction period setting sections 62 and 162 adjust the prediction periods T and T4 on the basis of whether or not the host-vehicle 81 is likely to interfere with the route of another vehicle 82, the length of the route may be adjusted.

The invention claimed is:

1. An environment prediction device for detecting an object in the vicinity of a host-vehicle, the environment prediction device comprising:

a road information acquisition unit which acquires information regarding a road;

a host-vehicle position prediction unit which predicts the position of the host-vehicle after a predetermined time has elapsed;

a prediction period setting unit which sets a prediction period on the basis of the information regarding the road and the position of the host-vehicle after the predetermined time has elapsed; and an environment prediction unit which predicts the behavior of the object in the vicinity of the host-vehicle until the prediction period elapses;

wherein, when upon the elapse of the predetermined time the position of the host-vehicle is in violation of a traffic rule acquired from the information regarding the road, the prediction period setting unit sets the prediction period longer than when the position of the host-vehicle observes the traffic rule.

2. The environment prediction device according to claim 1, further comprising:

an obstacle information acquisition unit which acquires obstacle information in the traveling direction of the host-vehicle, wherein the prediction period setting unit sets the prediction period also in consideration of the obstacle information.

3. The environment prediction device according to claim 1, wherein the prediction period setting unit sets, as the prediction period, a period until the position of the host-vehicle satisfies a predetermined condition.

4. The environment prediction device according to claim 3, wherein the prediction period setting unit sets, as the prediction period, a period until the host-vehicle reaches a position where the host-vehicle does not interfere with the route of another vehicle.

5. The environment prediction device according to claim 1, further comprising:

a behavior plan acquisition unit which acquires a behavior plan of the host-vehicle, wherein the host-vehicle position prediction unit predicts the position of the host-vehicle on the basis of the behavior plan.

6. The environment prediction device according to claim 1, wherein the prediction period setting unit sets the prediction period longer than the predetermined time.

7. The environment prediction device according to claim 1, wherein the host-vehicle position prediction unit limits prediction to a position where the host-vehicle is not deviated from the traffic rule.

* * * * *